(12) United States Patent
Gotoh et al.

(10) Patent No.: US 7,637,535 B2
(45) Date of Patent: Dec. 29, 2009

(54) INFLATOR FOR AN AIR BAG

(75) Inventors: Yuzo Gotoh, Himeji (JP); Yasunori Iwai, Shijyonawate (JP); Masayuki Nakayasu, Himeji (JP)

(73) Assignee: Daicel Chemical Industries, Ltd., Sakai-shi (JP)

( * ) Notice: Subject to any disclaimer, the term of this patent is extended or adjusted under 35 U.S.C. 154(b) by 0 days.

(21) Appl. No.: 12/130,886

(22) Filed: May 30, 2008

(65) Prior Publication Data

US 2008/0303255 A1  Dec. 11, 2008

Related U.S. Application Data

(62) Division of application No. 11/149,282, filed on Jun. 10, 2005, now Pat. No. 7,390,019.

(60) Provisional application No. 60/579,239, filed on Jun. 15, 2004.

(30) Foreign Application Priority Data

Jun. 10, 2004 (JP) ............................. 2004-172090

(51) Int. Cl.
*B60R 21/26* (2006.01)

(52) U.S. Cl. ...................................... 280/741; 280/736

(58) Field of Classification Search ................. 280/741, 280/737, 742, 736
See application file for complete search history.

(56) References Cited

U.S. PATENT DOCUMENTS

| 6,068,291 | A | 5/2000 | Lebaudy et al. |
| 6,547,277 | B1 | 4/2003 | Adamini et al. |
| 6,601,872 | B2 | 8/2003 | Zimbrich et al. |
| 6,880,853 | B2 * | 4/2005 | Watase et al. ................ 280/741 |
| 6,945,561 | B2 | 9/2005 | Nakashima et al. |
| 6,997,475 | B2 | 2/2006 | Watase et al. |
| 7,343,862 | B2 | 3/2008 | McCormick |
| 2003/0057689 | A1 | 3/2003 | Katsuda et al. |
| 2005/0017490 | A1 | 1/2005 | Yamazaki |
| 2005/0189754 | A1 | 9/2005 | Matsuda et al. |
| 2005/0189755 | A1 | 9/2005 | Numoto et al. |
| 2005/0194772 | A1 | 9/2005 | Numoto et al. |

(Continued)

FOREIGN PATENT DOCUMENTS

EP            1405775 A1    4/2004

(Continued)

*Primary Examiner*—Paul N Dickson
*Assistant Examiner*—Drew Brown
(74) *Attorney, Agent, or Firm*—Birch, Stewart, Kolasch & Birch, LLP

(57) ABSTRACT

An air bag inflator has a cylindrical housing defining an internal space therein and having a convex portion protruding towards the internal space, and a cup member provided inside the cylindrical housing and having a cylindrical wall, provided with a vent hole that communicates inside the cup member with a space defined by the cup member and an inner surface of the cylindrical housing, and an end wall closing a first end of the cylindrical wall. The cup member is supported inside the cylindrical housing by making contact with the convex portion. An inflator assembly method includes, forming the convex portion, providing the cup member, and inserting the cup member inside the internal space of the cylindrical housing, such that the cup member abuts the convex portion.

7 Claims, 8 Drawing Sheets

U.S. PATENT DOCUMENTS

| | | |
|---|---|---|
| 2006/0087106 A1 | 4/2006 | Young et al. |
| 2006/0249938 A1 | 11/2006 | Matsuda et al. |
| 2006/0273564 A1 | 12/2006 | McCormick et al. |
| 2009/0020992 A1 | 1/2009 | Jager et al. |

FOREIGN PATENT DOCUMENTS

| | | |
|---|---|---|
| JP | 2003-11769 A | 1/2003 |
| WO | WO-01/74631 A1 | 10/2001 |

* cited by examiner

INFLATOR FOR AN AIR BAG

CROSS REFERENCE TO RELATED APPLICATIONS

This application is a Divisional of co-pending application Ser. No. 11/149,282 filed on Jun. 10, 2005, now U.S. Pat. No. 7,390,019 and for which priority is claimed under 35 U.S.C. § 120; and this application claims priority of Application No. JP 2004-172090 filed in Japan on Jun. 10, 2004 and U.S. Provisional Application No. 60/579,239 filed on Jun. 15, 2004 under 35 U.S.C. § 119; the entire contents of all are hereby incorporated by reference.

BACKGROUND OF THE INVENTION

1. Field of the Invention

The present invention relates to an inflator for an air bag used in an air bag system of an automobile.

2. Description of the Related Art

A gas generator for an air bag inflator includes a type that mainly uses a pressurized gas as an air bag inflating medium, a type that uses only a solid gas generating agent (in which a gas is generated by combustion of the gas generating agent), and a type that uses both the pressurized gas and the solid gas generating agent. In order to simplify the assembly process of all of these types, there are demands for reductions in the number of components and simplification of the assembly operation.

In an inflator disclosed in JP-A No. 2003-11769, which uses a solid gas generating agent and a pressurized gas, a cup member is required to separate a space for charging the gas generating agent from the remaining space. In FIG. 1 of JP-A No. 2003-11769, for example, a cup member is used as a gas generating chamber housing 114, and the gas generating chamber housing 114 is welded to a boss 130 at 146. When this type of welding method is used, a large amount of equipment is required for the welding, and hence there is room for improvement in terms of simplifying the assembly process.

SUMMARY OF THE INVENTION

The present invention provides a simplified assembly process and an assembly method for an air bag inflator.

One of an aspect of the present invention is to provide an air bag inflator that includes: a cylindrical housing defining an internal space therein and having at least one convex portion protruding towards the internal space; and a cup member provided inside said cylindrical housing to separate the internal space into a first chamber and a second chamber, the cup member having a cylindrical wall, provided with at least one vent hole that communicates inside of the cup member with a space defined by said cup member and an inner surface of said cylindrical housing, and an end wall closing a first end of the cylindrical wall, said cup member being supported inside said cylindrical housing by making contact with the at least one convex portion.

Another aspect of the present invention is to provide an assembly method for an air bag inflator that includes: forming at least one convex portion that protrudes toward an internal space of a cylindrical housing; providing a cup member having a cylindrical wall, having a vent hole, and an end wall closing a first end of the cylindrical wall; and inserting the cup member inside the internal space of the cylindrical housing such that the cup member abuts the at least one convex portion.

The cup member for dividing the interior of the cylindrical housing into a plurality of spaces is supported and fixed by means of a simple fixing structure, and therefore the inflator for an air bag of the present invention can be assembled easily and through a simplified assembly process.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PRESENT INVENTION

(1) First Embodiment

Figure 1:
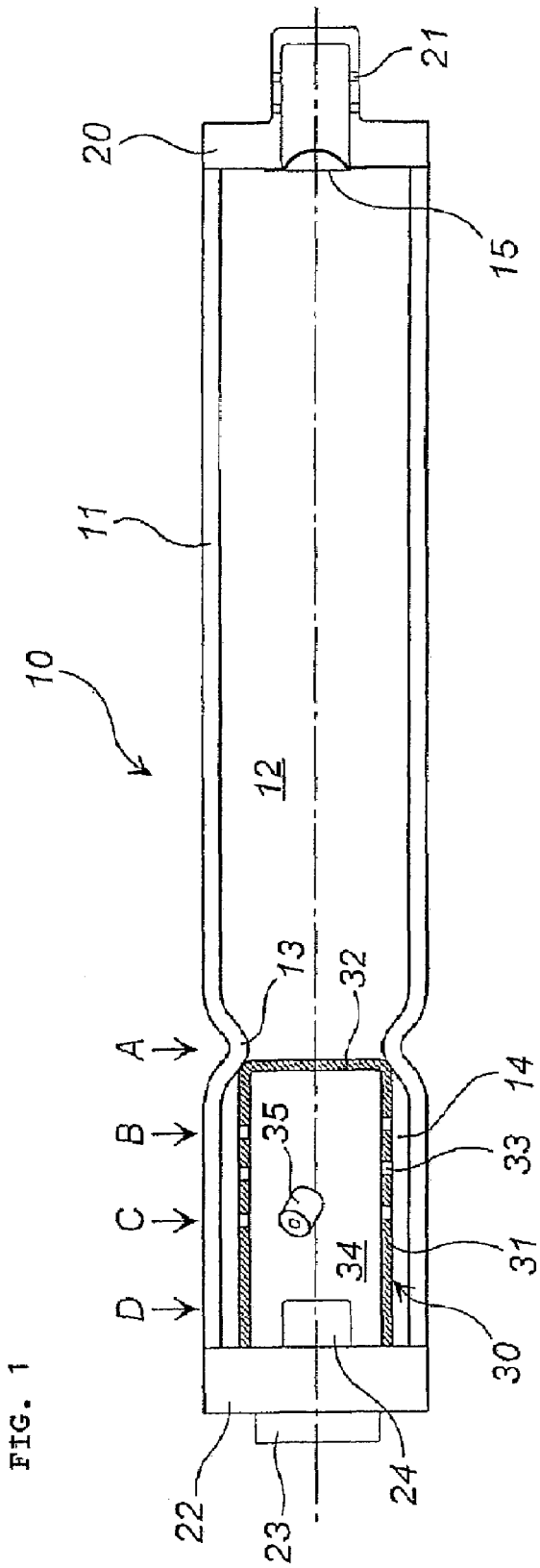
FIG. 1 is an axial cross-sectional view of a hybrid inflator along an axial direction thereof according to a first embodiment of the present invention.
Figure 2:
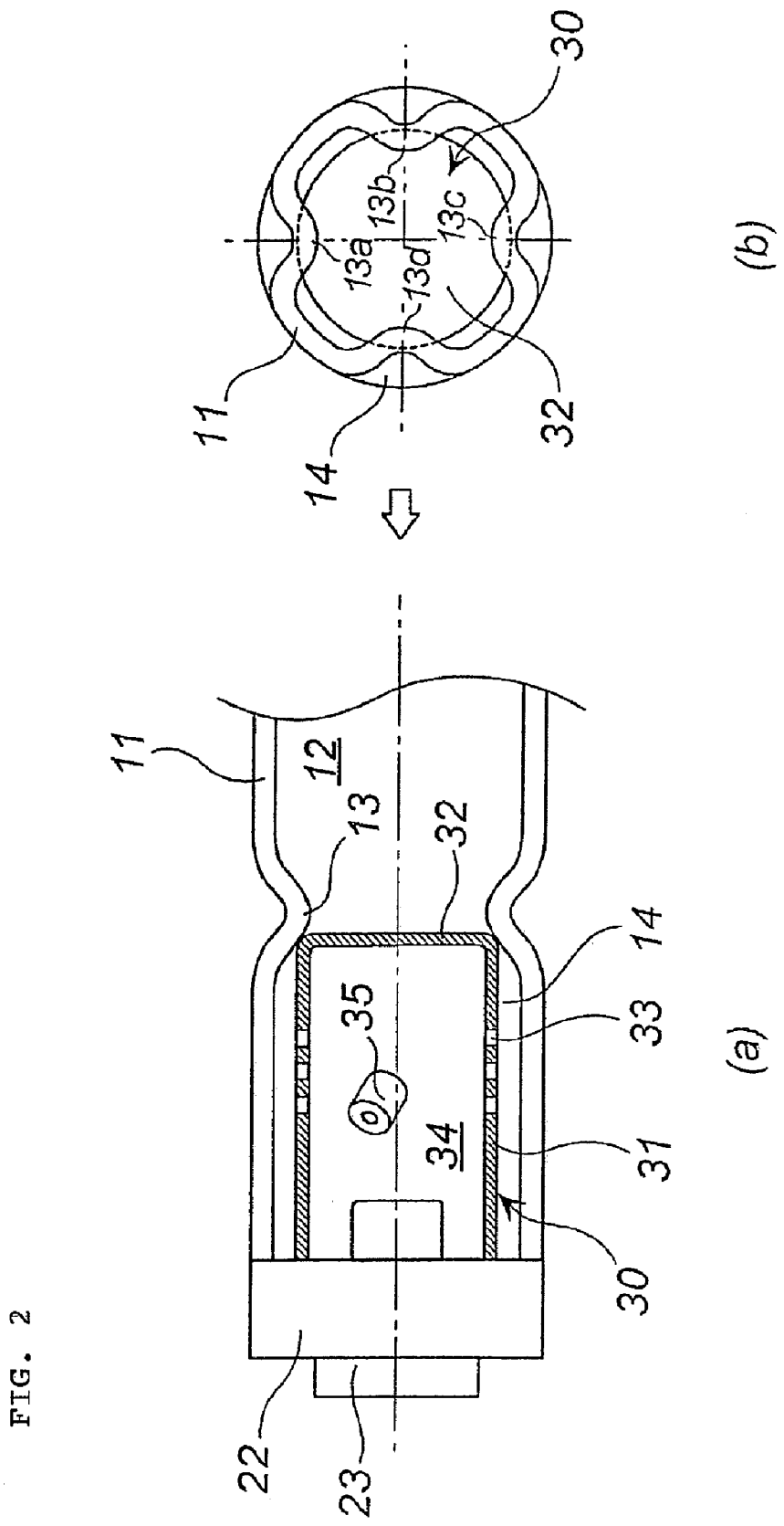
FIG. 2(a) is a partial cross-sectional view along the axial direction of FIG. 1.
FIG. 2(b) is a view seen from the direction of an arrow in FIG. 2(a)

A first embodiment of the present invention will be described by referring to FIGS. 1 and 2. FIG. 1 is a cross-sectional view of a hybrid inflator 10 along an axial direction thereof, FIG. 2(a) is a partial cross-sectional view of FIG. 1, and FIG. 2(b) is a view seen from the direction of an arrow in FIG. 2(a).

A diffuser portion 20 having a plurality of gas discharge ports 21 is welded and fixed to an opening portion at one end of a cylindrical housing 11, and a closure 22 is welded and fixed to an opening portion at the other end of the housing 11. An igniter 23 is attached to a central hole defined by the closure 22, such that an ignition portion 24 protrudes into an interior of the cylindrical housing 11.

A cup member 30 is disposed inside the cylindrical housing 11, such that the cup member 30 and the housing 11 are coaxially aligned. One end of the cup member 30 is open, and the other end is closed by an end surface 32. The cup member 30 is provided with a plurality of vent holes 33 in a peripheral surface 31 thereof. The one end of the cup member 30 abuts a surface of the closure 22, and a portion the peripheral surface 31 and the end surface 32 is supported by a convex portion 13 formed in the housing 11 to prevent the cup member 30 from moving inside the housing 11.

As shown in FIG. 2(b), the convex portion 13 is formed at four independent points along an imaginary line that extends in a circumferential direction of the peripheral surface of the cylindrical housing 11 by pressing the cylindrical housing 11 from an outside.

The cup member 30 is supported and fixed inside the housing 11 by being pressed from four directions by the four convex portions 13 (13a to 13d), and also by having the one end abut the surface of the closure 22. Hence the cup member 30 does not move in either the axial direction or the radial direction.

Note that due to pressure variation produced during an operation of the inflator 10, the cup member 30 may move slightly in the radial direction, but due to the existence of the convex portions 13 and a space 14 formed between the peripheral surface 31 and an inner surface of the housing 11, the gas flow is not obstructed.

In FIGS. 1 and 2, the convex portions 13 are formed along an imaginary line that extends in the circumferential direction of the housing 11. However, as long as the cup member 30 can be fixed and supported, the convex portions may be formed in different positions A, B, C, D along the axial direction of the housing 11, as shown in FIG. 1. Convex portions may also be formed at positions A, B, C, D in different circumferential positions. In position A, for example, a convex portion may be formed in the position indicated by reference number 13a in FIG. 2(b), and likewise, convex portions may be formed at position 13b in position B, at position 13c in position C, and at position 13d in position D.

The cup member 30 separates the interior of the cylindrical housing 11 into an interior of the cup member 30 that functions as a combustion chamber 34, and an interior space 12 that function as a pressurized gas charging space. A solid gas generating agent 35 is charged into the combustion chamber 34. Note that the space 14 defined between the cup member 30 and the cylindrical housing 11 communicates with the interior space 12, as shown in FIG. 2(b).

A pressurized gas is charged inside the interior space 12 and the space 14. The pressurized gas also flows into the combustion chamber 34 through the vent holes 33. A circular rupturable plate 15, made of stainless steel or the like, closes an opening that connects the interior space 12 and the diffuser portion 20. The circular rupturable plate 15 is welded and fixed to the diffuser portion 20 at the peripheral edge portion of the diffuser portion that defines the opening.

An operation of the inflator 10 when incorporated into an air bag system of an automobile will now be described by referring to FIG. 1.

When an automobile collides, the igniter 23 activates to ignite and burn the gas generating agent 35 in the combustion chamber 34, thereby generating a high-temperature gas. The high-temperature gas flows into the space 14 and the interior space 12 through the vent holes 33. The high-temperature gas then invariably impinges on a portion of the inner wall surface of the cylindrical housing 11 that opposes the vent holes 33, such that part of a mist (i.e., metallic components of the gas generating agent) contained in the high-temperature gas is cooled and solidified, and adheres to the inner wall surface. The influx of high-temperature gas causes the internal pressure of the interior space 12 to rise, thereby rupturing the rupturable plate 15 so that the pressurized gas is ejected through the gas discharge ports 21 to inflate the air bag. Even during this process, the cup member 30 supported and fixed by the four convex portions 13 and the closure 22 does not move in either the axial direction or the radial direction.

(2) Second Embodiment

A second embodiment of the present invention will be described by referring to FIG. 3. FIG. 3(a) is a partial cross-sectional view of a hybrid inflator along an axial direction thereof according to the second embodiment, and FIG. 3(b) is a view seen from the direction of an arrow shown in FIG. 3(a). The structure of the second embodiment is identical to that shown in FIGS. 1 and 2 except for the structure for fixing the cup member 30 inside the housing 11.

The cup member 30 is open at one end and the other end is closed by an end surface 32. The cup member 30 has a stepped portion 36 on the peripheral surface 31. The stepped portion 36 is an inclined surface. The open end of the cup member 30 is detached from the closure 22 and maintained in an open state.

The cup member 30 also has a larger diameter portion 31a having a larger inner diameter at the open end side and a smaller diameter portion 31b having a smaller inner diameter at the end surface 32 side, interposing the stepped portion 36 there between. The plurality of vent holes 33 is provided in the smaller diameter portion 31b.

The cup member 30 is supported and fixed to the housing 11 by a convex portion 13 formed in the peripheral surface of the housing 11 and extending towards the stepped portion 36. As shown in FIG. 3(b), the convex portion 13 is a continuous annular convex portion formed in the circumferential direction of the housing 11. Note that the support structure may be constituted by convex portions such as those shown in FIG. 2(b).

In this embodiment, the cup member 30 is supported and fixed to the housing 11 by the convex portion 13, such that the one end thereof does not make contact with any member, and hence the space surrounded by the cup member 30, the cylindrical housing 11, and the closure 22 forms the combustion chamber 34, into which a predetermined amount of the gas generating agent 35 is charged. The combustion chamber 34 and the interior space 12 communicate with each other through the vent holes 33.

In this embodiment, the volume of the interior space 12 and the volume of the combustion chamber 34 can be easily adjusted to desired proportions by adjusting the position of the convex portion 13 in the axial direction of the housing 11. As a result, the charging amount of the gas generating agent and the charging amount of the pressurized gas can be adjusted easily, which is particularly suitable for an inflator that uses both the combustion gas generated by the gas generating agent and a pressurized gas as an air bag inflating media.

(3) Third Embodiment

Figure 4:
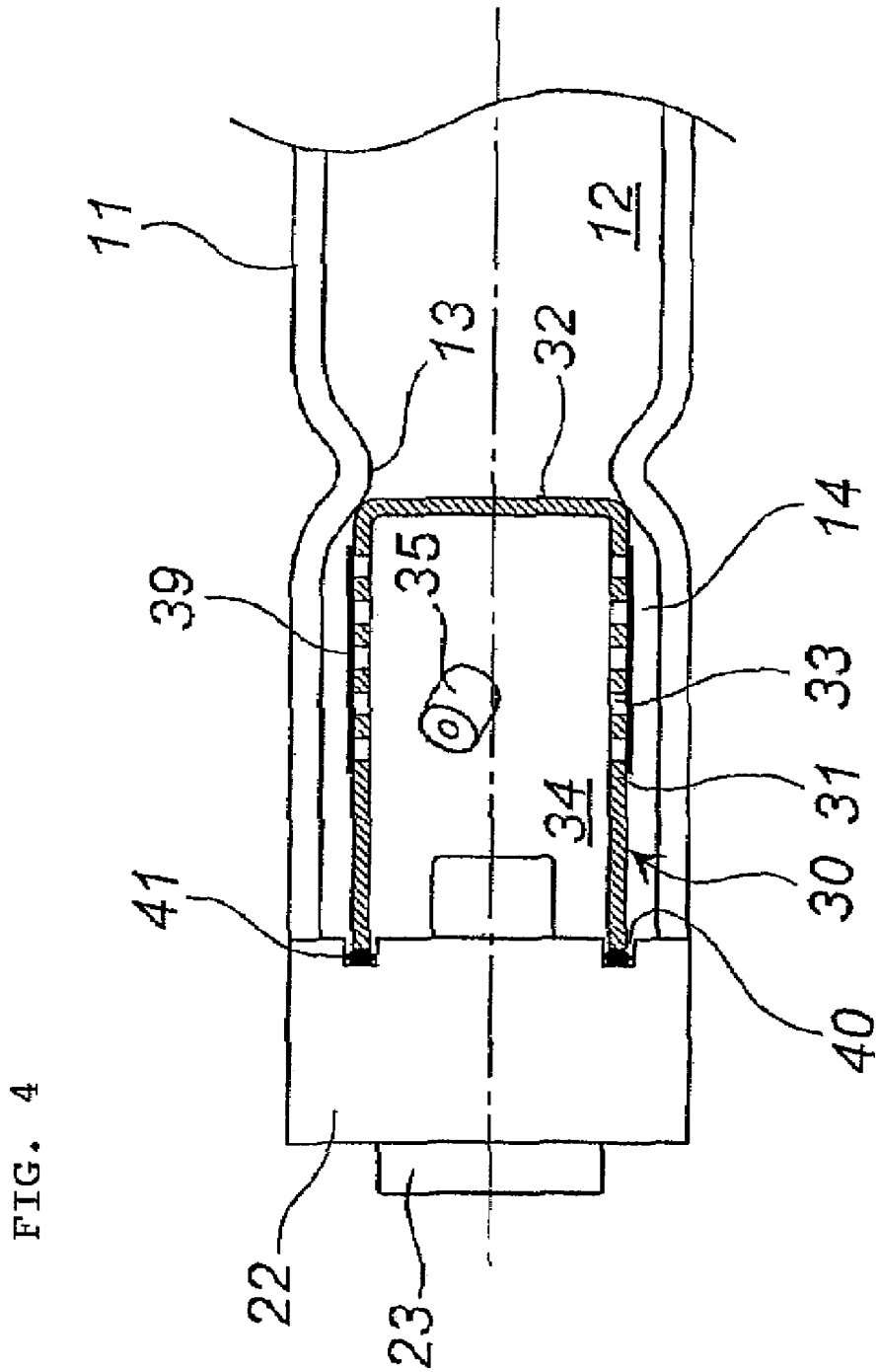
FIG. 4 is a partial cross-sectional view of a hybrid inflator along an axial direction thereof according to a third embodiment of the present invention.

A third embodiment of the present will be described by referring to FIG. 4. FIG. 4 is a partial cross-sectional view of a hybrid inflator along an axial direction thereof according to the third embodiment. The structure of the third embodiment is identical to that shown in FIGS. 1 and 2 except for the structure for fixing the cup member 30 inside the housing 11.

One end of the cup member 30 is open and the open end is inserted into an annular groove 40, formed in a surface of a closure 22, that has a diameter and a width equal to those of the open end. An 0-ring 41 for maintaining air tightness is disposed between the annular groove 40 and an edge of the open end. The vent holes 33 of the cup member 30 are closed from the outside by a metallic adhesive tape 39 made of a stainless steel or the like, and therefore no pressurized gas exists in the interior of the cup member 30, which functions as the combustion chamber 34.

The cup member 30 is supported and fixed inside the housing 11 by the four convex portions 13, which press against the cup member 30 including the boundary between the peripheral surface 31 and the end surface 32 as shown in FIG. 2(b), and also by the groove 40 that supports an end opening. The O-ring 41 is preferably pressed flat by the peripheral edge of an opening portion of the cup member 30 in order to increase the air tightness inside the cup member 30.

In this embodiment, positioning of the cup member 3D with respect to the housing 11 can be performed easily by simply fitting the end opening of the cup member 30 into the annular groove 40 formed in the closure 22, and hence the workability of the assembly process can be improved.

Further, by fitting the opening portion of the cup member into the annular groove 40, the cup member 30 can be positioned, and the cup member 30 can be supported and fixed more securely. The volume of the interior space formed by the cup member 30 is substantially equal to the internal volume of the cup member 30.

(4) Fourth Embodiment

Figure 5:
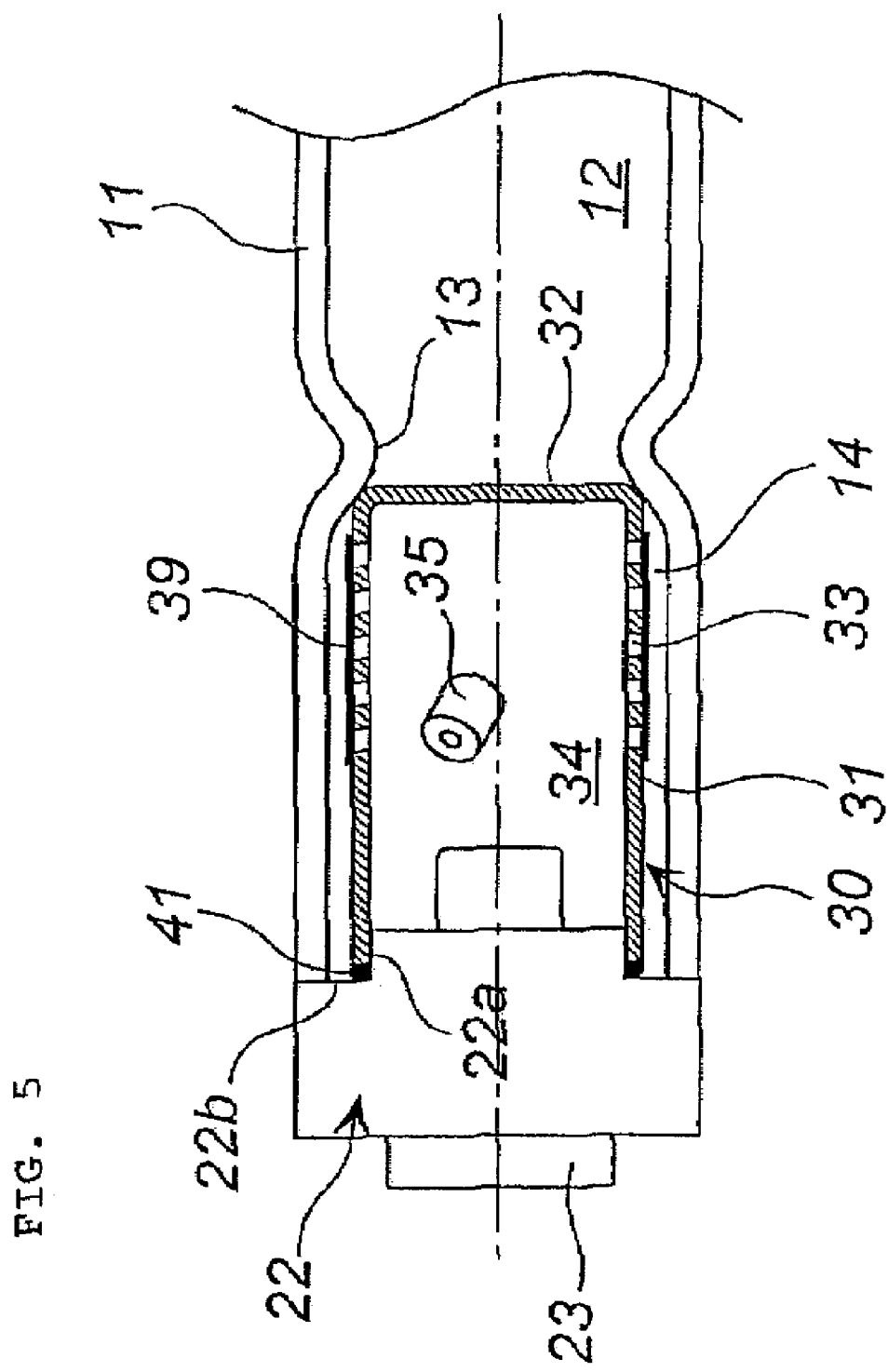
FIG. 5 is a partial sectional view of a hybrid inflator along an axial direction thereof according to a fourth embodiment of the present invention.

A fourth embodiment of the present invention will be described by referring to FIG. 5. FIG. 5 is a partial sectional view of a hybrid inflator along an axial direction thereof according to the fourth embodiment. The structure of the fourth embodiment is identical to that shown in FIGS. 1 and 2 except for the structure for fixing the cup member 30 inside the housing 11.

The end opening of the cup member 30 is fitted around a protruding portion 22a protruding from the closure 22, which closes the end of the cylindrical housing 11. An outer diameter of the protruding portion 22a and an inner diameter of the opening portion are substantially identical.

The 0-ring 41 is disposed between a stepped portion surface 22b of the closure 22 and the edge of the opening portion to maintain air tightness. The vent holes 33 of the cup member 30 are closed from the outside by the metallic adhesive tape 39 made of a stainless steel or the like, and therefore no pressurized gas exists in the interior of the cup member 30, which functions as the combustion chamber 34.

The cup member 30 is supported and fixed to the housing 11 by the four convex portions 13, which press against the cup member 30 including the boundary between the peripheral surface 31 and the end surface 32 as shown in FIG. 2(b), and also by being fitted to the protruding portion 22a of the closure 22. The 0-ring 41 is preferably pressed flat by the peripheral edge of the end portion of the cup member 30 in order to increase the air tightness inside the cup member 3D.

In this embodiment, positioning of the cup member 30 inside the housing 11 can be performed easily by simply fitting the end portion of the cup member 30 to the protruding portion 22a of the closure 22, and hence the workability of the assembly process can be improved.

(5) Fifth Embodiment

Figure 6:
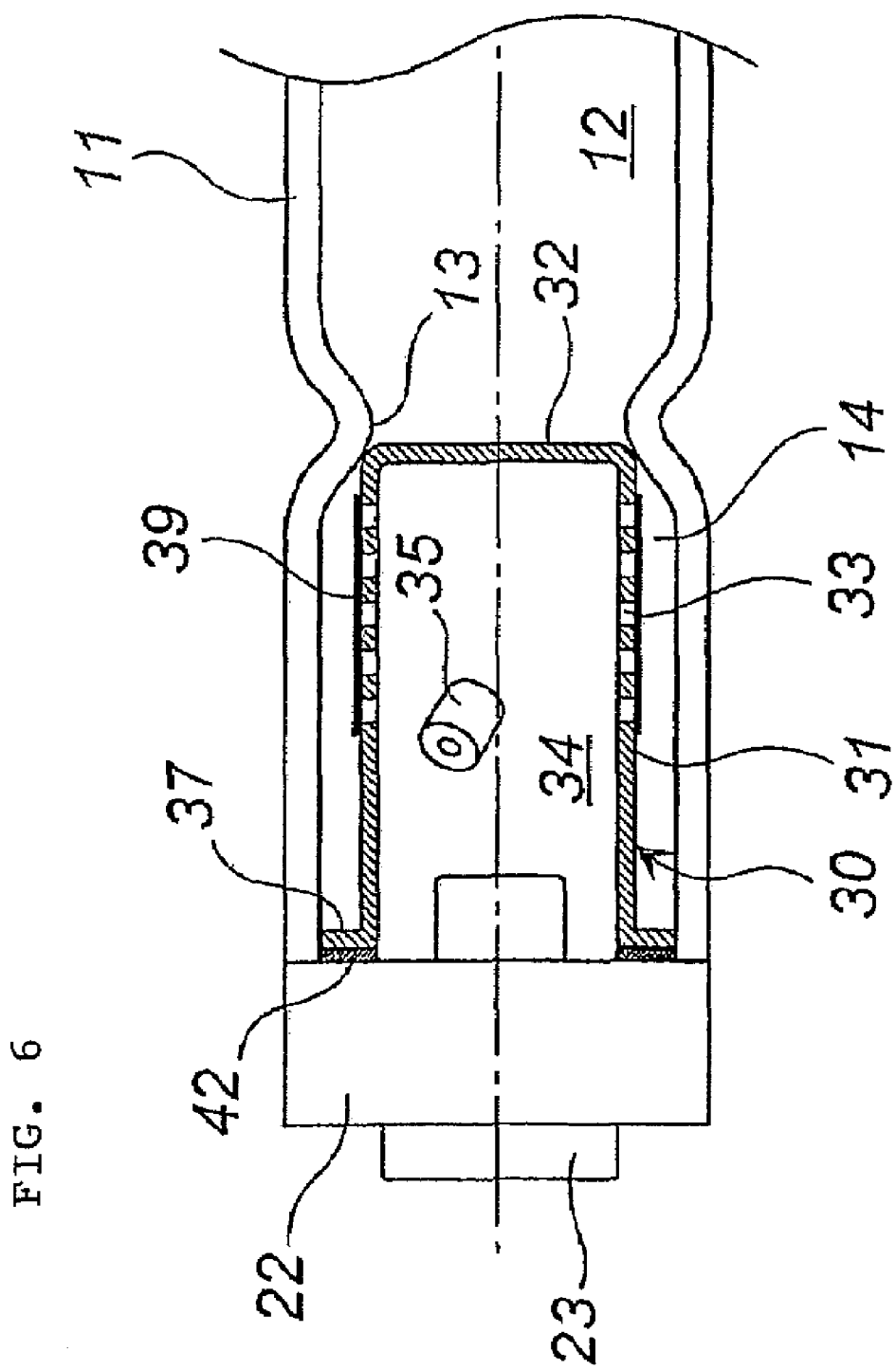
FIG. 6 is a partial cross-sectional view of a hybrid inflator along an axial direction thereof according to a fifth embodiment of the present invention.

A fifth embodiment of the present invention will be described by referring to FIG. 6. FIG. 6 is a partial cross-sectional view of a hybrid inflator along an axial direction thereof according to the fifth embodiment. The structure of the fifth embodiment is identical to that shown in FIGS. 1 and 2 except for the structure for fixing the cup member 30 inside the housing 11.

The cup member 30 comprises a flange portion 37 at the end portion, and the diameter of the cup member 30, including the length of the flange portion 37, is substantially equal to the inner diameter of the cylindrical housing 11. Hence, positioning of the cup member 30 can be performed automatically by simply inserting the cup member 30 into the cylindrical housing 11.

An annular gasket 42 for maintaining air tightness inside the cup member 30 is interposed between the flange portion 37 and closure 22. The vent holes 33 of the cup member 30 are closed from the outside by the metallic adhesive tape 39 made from a stainless steel or the like, and therefore no pressurized gas exists in the interior of the cup member 30, which functions as the combustion chamber 34.

The cup member 30 is supported and fixed inside the housing 11 by the four convex portions 13, which press against the cup member 30 including the boundary between the peripheral surface 31 and the end surface 32 as shown in FIG. 2(b), and also by the flange portion 37 which makes contacts with the closure 22.

In this embodiment, positioning of the cup member 30 can be performed easily by simply inserting the cup member 30 into the cylindrical housing 11, and hence the workability of the assembly process can be improved.

(6) Sixth Embodiment

Figure 7:
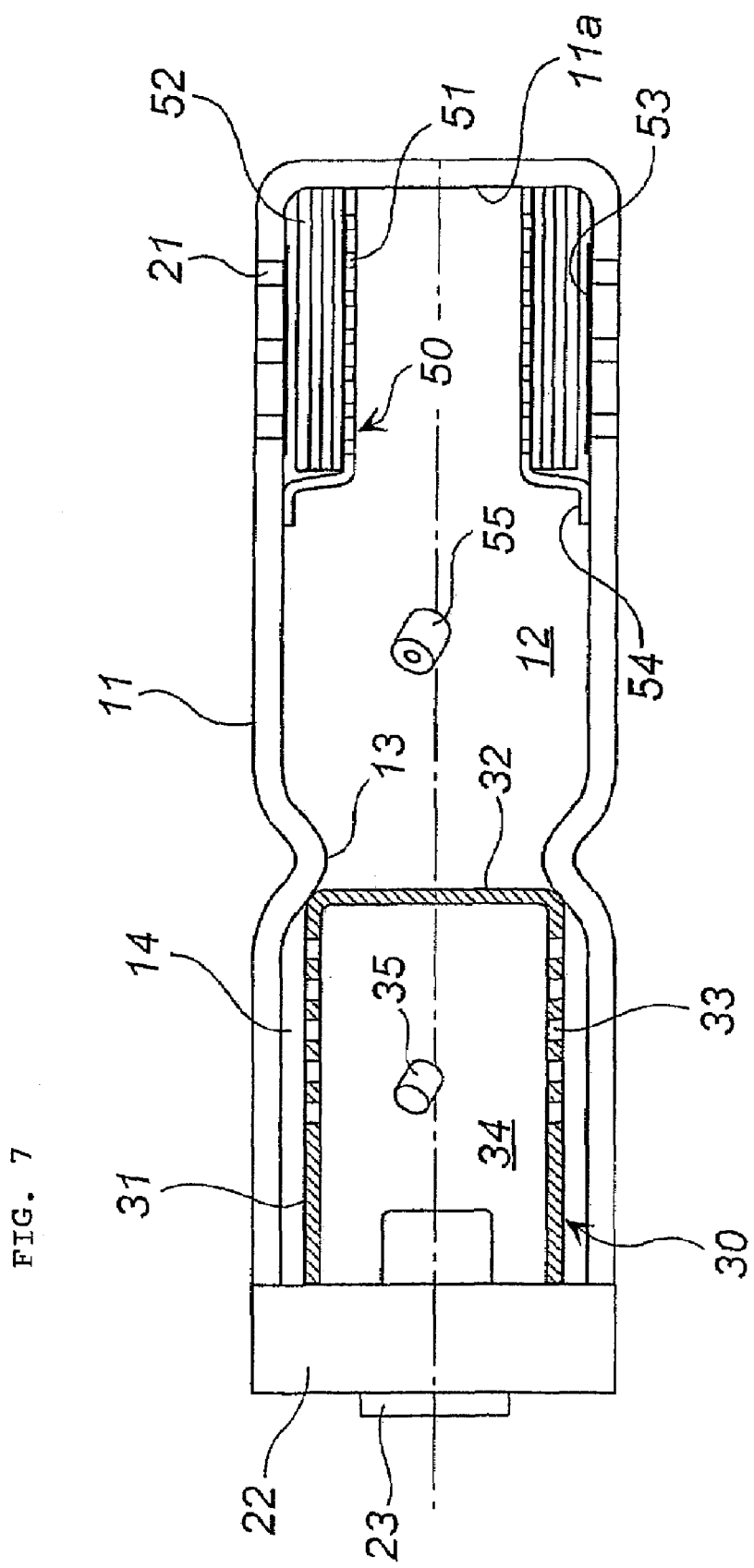
FIG. 7 is a partial cross-sectional view of a single type pyrotechnic inflator along an axial direction thereof according to a sixth embodiment of the present invention.

A sixth embodiment of the present invention will be described by referring to FIG. 7. FIG. 7 is a partial cross-sectional view of a pyrotechnic inflator. The way the cup member 30 is attached to the housing 11 is the same as that shown in FIG. 2.

A plurality of gas discharge ports 21 is provided in a peripheral wall of the cylindrical housing 11 close to a first end thereof. The gas discharge ports 21 are closed from the inside by a metallic adhesive tape 53 made of stainless steel or the like.

A cylindrical coolant/filter 52 is disposed inside the interior space 12, such that it opposes the gas discharge ports 21. A gap is provided between the outer peripheral surface of the coolant/filter 52 and the inner peripheral surface of the cylindrical housing 11 where the gas discharge ports 21 are formed.

The coolant/filter 52 is positioned and supported immovably by a retainer 50 substantially cylindrical in shape. The retainer 50 comprises a plurality of vent holes 51 in its peripheral surface, and is fixed to the housing 11 by pressing a flange portion 54, formed at a first end of the retainer 50, against the inner wall surface of the cylindrical housing 11 and also by abutting a second end, opposite to the first end, of the retainer against an end surface 11a of the cylindrical housing 11.

In the inflator of this embodiment, a gas generating agent 55 is also charged into the interior space 12 by a required amount. The interior space 12 communicates with the combustion chamber 34, into which the gas generating agent 35 is charged, inside the interior of the cup member 30 through the open vent holes 33, and hence the interior space 12 and combustion chamber 34, in combination, form a single combustion chamber.

Since only a single igniter 23 is disposed in the interior of the cup member 30, the inflator of this embodiment is a single type pyrotechnic inflator having a single igniter and a single combustion chamber.

Note that in this inflator, the gas generating agent 35 ignites first, and causes the gas generating agent 55 to ignite. Hence, a material having a good ignitability (e.g., a higher combustion temperature), such as a gas generating agent containing nitroguanidine as a fuel, may be used as the gas generating agent 35, whereas a combustion temperature) than the gas generating agent 35, such as a gas generating agent containing guanidine nitrate as a fuel, may be used as the gas generating agent 55. By increasing the amount of the gas generating agent 55 having a lower combustion temperature, the overall temperature of the generated combustion gas decreases, and hence the amount of the coolant/filter 52 can be reduced.

When the igniter 23 is activated, the gas generating agent 35 in the combustion chamber 34 is ignited and burned first, thereby generating a high-temperature gas. The high-temperature gas flows into the interior space 12 through the vent holes 33, thereby igniting and burning the gas generating agent 55, such that a high-temperature gas is generated. This high-temperature gas passes through the vent holes 51 in the retainer 50, and filtered and cooled by the coolant/filter 52. The gas then ruptures the metallic adhesive tape and ejected through the gas discharge ports 21, thereby inflating the air bag.

(7) Seventh Embodiment

Figure 8:
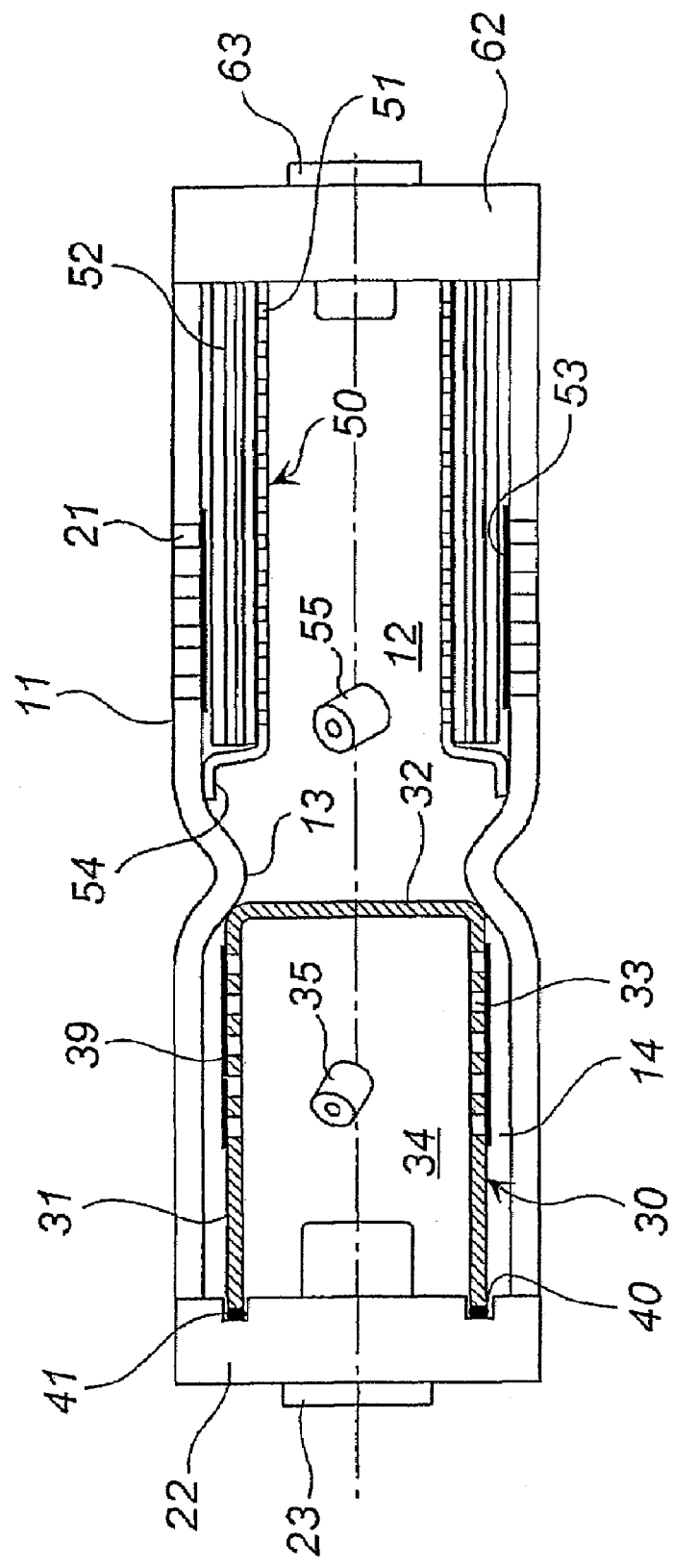
FIG. 8 is a partial cross-sectional view of a dual type pyrotechnic inflator along an axial direction thereof according to a seventh embodiment of the present invention.

A seventh embodiment of the present invention will be described by referring to FIG. 8. FIG. 8 is a sectional view of a pyrotechnic inflator along an axial direction thereof according to the seventh embodiment. The way the cup member 30 is attached to the housing 11 is the same as that shown in FIG. 4.

One end of the cylindrical housing 11 is closed by a second closure 22 that supports a second igniter 23, in a manner similar to FIG. 4, and the other end thereof is closed by a first closure 62 that supports a first igniter 63.

The plurality of gas discharge ports 21 is provided in the peripheral surface of the cylindrical housing 11 at positions closer to the first closure 62 side with respect to the convex portions 13, and the gas discharge ports 21 are closed from the inside by the metallic adhesive tape 53 made of a stainless steel or the like.

The cylindrical coolant/filter 52 is disposed in the interior space 12, such that it opposes the gas discharge ports 21. A gap is provided between the outer peripheral surface of the coolant/filter 52 and the inner peripheral surface of the cylindrical housing 11 at a position where the gas discharge ports 21 are formed.

The coolant/filter 52 is supported immovably by the retainer 50 substantially cylindrical in shape. The retainer 50 comprises the plurality of vent holes 51 in its peripheral surface, and is fixed by pressing, the flange portion 54 formed at one end of the retainer 50, against the inner wall surface of the cylindrical housing 11, and abutting the peripheral edge at the other end of the retainer against the first closure 62.

In the inflator of this embodiment, the gas generating agent 55 is also charged into the interior space 12 by a required amount. The interior space 12 and the interior of the cup member 30 are formed as separate, independent spaces, and hence the interior space 12 forms a first combustion chamber 12, and the interior of the cup member 30 forms a second combustion chamber 34, into which the gas generating agent 35 is charged.

Note that the cylindrical housing 11 may be provided with separate gas discharge ports and a separate coolant/filter between the closure 22 and convex portions 13 such that the high-temperature gas generated in the second combustion chamber 34 passes through the separate coolant/filter and discharged from the separate gas discharge ports.

The inflator of this embodiment is a dual type pyrotechnic inflator having two igniters and two combustion chambers, and is therefore capable of responding to three activation patterns: simultaneous activation of the first igniter 63 and second igniter 23; activation of the first igniter 63 first and the second igniter 23 with a delay; and activation of the first igniter 63 alone. Note, however, that in order to ensure safety when the vehicle is dismantled, the second igniter 23 is also activated in this case with a delay of approximately 100 milliseconds.

When the first igniter 63 is activated first, the gas generating agent 55 in the first combustion chamber 12 is ignited and burned, thereby generating a high-temperature gas. The high-temperature gas passes through the vent holes 51 in the retainer 50 and filtered and cooled by the coolant/filter 52. The gas then ruptures the metallic adhesive tape 53 and ejected through the gas discharge ports 21, and thus the air bag is inflated. The vent holes 33 in the cup member 30 are closed from the outside by the stainless steel tape 39, and therefore the high-temperature gas generated in the first combustion chamber 12 does not flow into the second combustion chamber 34.

When the second igniter 23 is activated with a slight delay, the gas generating agent 35 in the second combustion chamber 34 is ignited and burned, thereby generating a high-temperature gas. The high-temperature gas ruptures the stainless steel tape 39, flows through the vent holes 33 into the first combustion chamber 12, passes through the vent holes 51 in the retainer 50 and filtered and cooled by the coolant/filter 52, and is then ejected through the gas discharge ports 21 to inflate the air bag further.

(8) Assembly Method

An inflator assembly method will now be described for each of the embodiments described above.

At least one of the following methods may be applied for the assembly of the inflators described in the foregoing embodiments.

(I) A method of forming the convex portion 13 by pressing the cylindrical housing 11 at a predetermined position from the outside, and then press-inserting the cup member 30 through the end opening at one end of the cylindrical housing 11 to the formation position of the convex portion 13, such that the cup member is supported and fixed inside the housing 11.

(II) A method of inserting the cup member 30 through the end opening of the cylindrical housing 11, and then forming the convex portion 13 by pressing the cylindrical housing 11 at a predetermined position from the outside, such that the cup member 30 is supported and fixed inside the housing 11.

(III) A two-stage fixing method including the steps of forming the convex portion 13 having a relatively low height by pressing the cylindrical housing 11 lightly, and then once the cup member has been inserted, forming the convex portion 13 having a relatively high height by pressing the cylindrical housing 11 deeply, such that the cup member is fixed inside the housing 11.

To assemble the inflator described in the first embodiment shown in FIG. 2, the methods (I), (II), and (III) may be applied. When the method (I) is applied, first the peripheral surface of the cylindrical housing 11 is pressed from the outside at the illustrated positions to form the convex portions 13, whereupon the diffuser portion 20, to which the rupturable plate 15 is welded, is fixed to the housing 11 by welding.

Next, the cup member 30 is inserted until the boundary portion between the peripheral surface 31 and the end surface 32 abuts the convex portions 13, and the gas generating agent 35 is charged therein. The closure 22 supporting the igniter 23 is then fixed to the housing 11 by laser welding or the like. The surface of the closure 22 presses against the peripheral edge of the end opening of the cup member 30, and hence the convex portions 13 press against the cup member 30. Thereafter, pressurized gas is charged into the interior space 12. The pressurized gas is charged through a gas charging hole, provided in the housing 11, and the gas discharging hole is closed by a blocking pin. The charging hole is sealed by welding the blocking pin.

Figure 3:
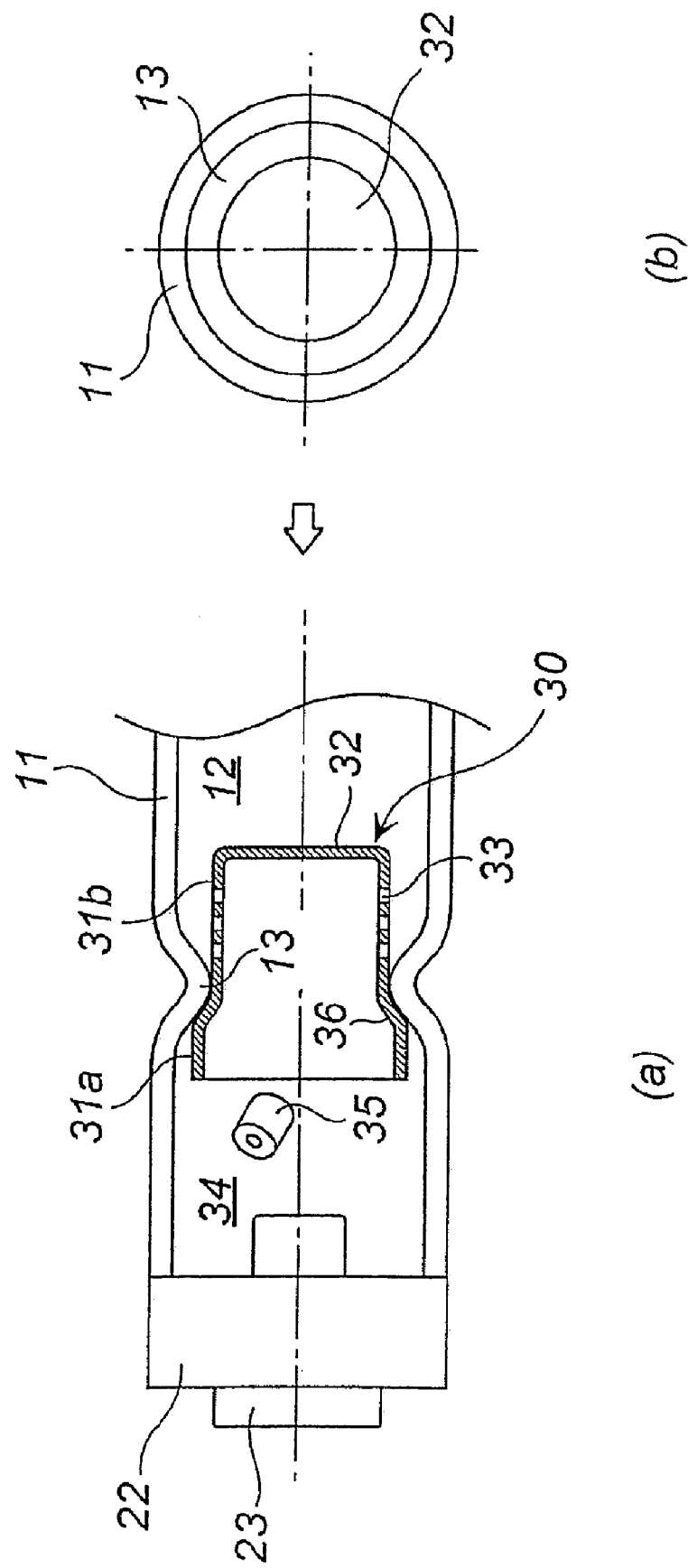
FIG. 3(a) is a partial cross-sectional view of a hybrid inflator along an axial direction thereof according to a second embodiment of the present invention.
FIG. 3(b) is a view seen from the direction of an arrow in FIG. 3(a)

To assemble the inflator described in the second embodiment shown in FIG. 3, the method (I) is preferably applied. First, the convex portion 13 is formed by pressing the peripheral surface of the cylindrical housing 11 from the outside in the illustrated position. The cup member 30 is then inserted until the stepped portion (i.e., the stepped inclined surface) 36 abuts against the convex portion 13. The gas generating agent 35 is then charged inside the cup member 30, and the closure 22 that supports the igniter 23 is fixed to the housing 11 by laser welding or the like. The cup member 30 is supported and fixed by the convex portion 13.

To assemble the inflator described in the third embodiment shown in FIG. 4, the methods (I), (II), and (III) described above may be applied. When the method (II) is applied, for example, the cup member 30 charged with the gas generating agent 35 is inserted into the cylindrical housing 11 in such a state that the peripheral edge of the opening portion of the cup member 30 is fitted into the annular groove 40, in which the 0-ring 41 is disposed, formed in the closure 22 that supports the igniter housing 11 is then pressed from the outside at the illustrated positions to form the convex portions 13. The cup member 30 is thus pressed by the closure 22 and convex portions 13, and thereby supported and fixed inside the housing 11. The 0-ring 41 is pressed flat by the cup member 30.

The closure 22 is then fixed to the housing 11 by laser welding or the like. The peripheral edge of the opening portion of the cup member 30 presses against the 0-ring 41 due to the pressure of the pressurized gas charged into the interior space 12, and hence the air tightness of the interior of the cup member 30 is maintained to prevent the pressurized gas from flowing into the interior of the cup member 30 by the 0-ring 41 and the metallic adhesive tape 39 blocking the gas vents 33.

To assemble the inflator described in the fourth embodiment shown in FIG. 5 and the fifth embodiment shown in FIG. 6, the methods (I), (II), and (III) described above may be applied, but the method (I) is preferable.

To assemble the inflator described in the embodiments shown in FIGS. 7 and 8, any one of methods (I), (II), and (III) described above may be applied, but the method (I) is preferable. In these embodiments, first the cylindrical filter 52 and other necessary components are inserted into the cylindrical housing 11, and then the convex portions 13 are formed by pressing the peripheral surface of the cylindrical housing 11 from the outside at the illustrated positions. The gas generating agent 55 is then charged therein. Thereafter, the assembly process utilized in the embodiments shown in FIGS. 2 and 4 is applied.

When the method (III) is applied to the embodiments shown in FIG. 2 and FIGS. 4 to 6, first the convex portions 13 are formed as slight protrusions by pressing the cylindrical housing 11 lightly. Note, however, that in order to position the cup member 30 in the axial direction, the convex portions 13 should be formed to a height which enables at least part of the inserted cup member 30 (e.g., the peripheral edge portion of the end surface 32) to abut against the convex portions 13. When the methods (II) and (III) are applied, the cup member 30 is charged with the gas generating agent 35. Therefore, it is preferable to adjust. The pressing depth (i.e., the height of the convex portions 13) and the pressing position (i.e., the axial position of the convex portions 13) on the outer surface of the cylindrical housing 11, such that the cup member 30 can be supported and fixed inside the housing 11, while preventing the cup member 30 from denting which may cause the gas generating agent 35 to break.

By applying the foregoing assembly methods, a simple pressing method or the like can be applied in place of welding when disposing the cup member 30.

In the foregoing embodiments, the space in the interior and exterior of the cup member may be charged with the same air bag inflating medium or different air bag inflating media according to the communication state of the spaces. The pressurized gas may be an inert gas such as argon, helium or neon, nitrogen gas or the like.

In the foregoing embodiments, the cup member is supported and fixed by at least a convex portion formed on the cylindrical housing, and is therefore prevented from moving in either an axial direction or a radial direction of the cylindrical housing. As a result, welding of the cup member to the cylindrical housing is not required, and hence the assembly process is simplified.

In the foregoing embodiments, the convex portion is formed on the surface of the cylindrical housing in the circumferential direction. However, the convex portion may be formed in at least two different positions in the axial direction. The convex portion may be formed by using a method of pressing the outer surface of the cylindrical housing to form a dent in the outer surface, a method of piercing the wall surface of the cylindrical housing with a rod-form member (for example, a pin which closes a charging hole when the pressurizing medium is charged may be used), or the like. Further, in the embodiments, the convex portion is formed on the surface of the cylindrical housing in the circumferential direction. However, the convex portion may be formed in at least two different positions in the axial direction of the cylindrical housing.

In the foregoing embodiments, the cup member is supported by the convex portion either at the peripheral surface or at the boundary part between the bottom surface and peripheral surface. However, the cup member may be supported at the bottom surface.

As described in the foregoing embodiments, the cup member preferably has a constant diameter, but the diameter may become gradually larger or gradually smaller from the bottom surface toward the opening portion. Alternatively, one, two, or more stepped portions that are stepped in the radial direction may be provided, and the diameter may be modified at these stepped portions. The peripheral surface and bottom surface of the cup member may be separate members that are combined.

The vent hole provided in the cup member may be provided in one or both of the peripheral surface and bottom surface. When the vent hole is provided in the peripheral surface, the combustion gas ejected through the vent hole when the gas generating agent is charged into the interior of the cup member impinges on the inner wall surface of the cylindrical housing such that mist is trapped on the wall surface, which is preferable.

In the case where the inflator which uses pressurized gas, the cylindrical housing and cup member are preferably formed from highly pressure-resistant steel or the like. The cylindrical housing and cup member preferably have a circular cross section, but may take another sectional form such as an elliptical form.

The gas discharge port may be provided in the peripheral surface and/or the end surface, and in order to maintain moisture resistance when a solid gas generating agent is charged, the gas discharge port is preferably closed by an aluminum tape or the like. To maintain air tightness inside the cylindrical housing when pressurized gas is charged, a metallic rupturable plate or the like closes between the gas discharge port and the interior of the cylindrical housing.

In the foregoing embodiments, the opening portion of the cup member abuts against a closure surface of a closure that closes the end surface of the cylindrical housing. However, the opening portion may abut against an end surface of the cylindrical housing formed by bending an end portion of the cylindrical housing.

In the foregoing embodiment, since the cup member is supported and fixed by the convex portion and the opening portion of the cup member which abuts against the closure surface, the cup member can be supported and fixed more securely. Furthermore, since the opening portion of the cup member abuts against the closure surface, the interior space and exterior space of the cup member are partitioned. The volume of the interior space formed by the cup member is set to be equal to the internal volume of the cup member.

In the foregoing embodiments, the opening portion of the cup member is maintained in an open state, or in other words the opening portion does not abut against any other members (the aforementioned closure surface, for example). Therefore, the volume of the interior space formed by the cup member (more specifically, the volume of the space formed by the cup member and the cylindrical housing) can be increased beyond the internal volume of the cup member.

When the opening portion of the cup member abuts against the closure surface, the volume of the interior space formed by the cup member is equal to the internal volume of the cup member. Therefore, the size of the cup member should be altered to adjust the volumes of the interior space and exterior space formed by the cup member. However, the volume of the space inside the cylindrical housing can be adjusted easily without altering the size of the cup member.

In the embodiment of the present invention, a step is provided in the peripheral surface of the cup member so that the cup member is supported and fixed by the convex portion at the stepped portion. Even in this case, the cup member can be supported and fixed with equal strength as in case where the opening portion of the cup member abuts against the closure surface.

The gas generating agents charged into different spaces (the spaces in the interior and on the exterior of the cup member) may be varied in charging amount, composition (components and proportions), size, shape, and so on in accordance with the operating performance requirements of the inflator.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention further provides the following preferable embodiments:

1. An inflator for an air bag for inflating an air bag by discharging an air bag inflating medium existing within a cylindrical housing through a gas discharge port provided in the cylindrical housing, wherein the interior of the cylindrical housing is partitioned into at least two spaces by a cup member disposed in an axial direction of the housing interior, having one end side open and another end side closed and comprising a vent hole, the air bag inflating medium existing in at least one of the spaces, the cup member is supported and fixed on at least one of a peripheral surface and a bottom surface thereof by a convex portion formed on an inner wall surface of the cylindrical housing in a circumferential direction, and the at least two spaces partitioned by the cup member communicate with each other.

2. The above shown inflator wherein an opening portion of the cup member abuts against an end surface of the cylindrical housing or a closure surface closing the end surface of the cylindrical housing, and the cup member is supported and fixed on at least one of the peripheral surface and bottom surface thereof by the convex portion formed on the inner wall surface of the cylindrical housing.

3. The above shown inflator wherein the cup member comprises a stepped portion on the peripheral surface thereof, the opening portion is maintained in an open state, and the cup member is supported and fixed at the stepped portion by the convex portion formed on the inner wall surface of the cylindrical housing.

4. The above shown inflator wherein the opening portion of the cup member is fitted into an annular groove formed on the end surface of the cylindrical housing or the closure surface closing the end surface of the cylindrical housing, and the cup member is supported and fixed on at least one of the peripheral surface and bottom surface thereof by the convex portion formed on the inner wall surface of the cylindrical housing.

5. The above shown inflator wherein the opening portion of the cup member is fitted into a protruding portion provided on the closure surface closing the end surface of the cylindrical housing, and the cup member is supported and fixed on at least one of the peripheral surface and bottom surface thereof by the convex portion formed on the inner wall surface of the cylindrical housing.

6. The above shown inflator wherein the cup member comprises a flange portion on the opening portion, the flange portion abuts against the inner wall surface of the cylindrical housing and the end surface of the cylindrical housing or the closure surface closing the end surface of the housing, and the cup member is supported and fixed on at least one of the peripheral surface and bottom surface thereof by the convex portion formed on the inner wall surface of the cylindrical housing.

7. The above shown inflator wherein a pressurized gas serving as the air bag inflating medium exists in at least one of the spaces partitioned by the cup member, and a gas generating agent exists in the remaining space.

8. The above shown inflator wherein a gas generating agent serving as the air bag inflating medium exists in at least one of the spaces partitioned by the cup member, and a pressurized gas does not exist in the cylindrical housing.

9. An assembly method for the above shown inflator, comprising a step of forming an annular convex portion, or two or more independent convex portions, in the housing inner wall surface of the cylindrical housing by pressing the cylindrical housing in a predetermined position from the outside.

10. The above shown inflator wherein the convex portion is constituted by a continuous convex portion (annular convex portion), or by at least two separate, independent convex portions.

It is preferable that the at least two spaces partitioned by the cup member consist of at least two spaces (the space on the exterior of the cup member) formed by the cup member when disposed inside the cylindrical housing. However, depending on the embodiment, another space (the space in the interior of the cup member) surrounded by the cup member may also exist. The space on the exterior of the cup member and the space in the interior of the cup member may communicate with each other prior to an activation of the inflator, or may not communicate with each other prior to an activation of the inflator.

Inflators for an air bags include those that use mainly pressurized gas as the air bag inflating medium (hybrid inflators), those that use only a gas generating agent as the air bag inflating medium (pyrotechnic inflators), and those that use both. The present invention may be applied to all types of inflators. Furthermore, the present invention may be applied to a single type inflator which uses a single igniter, or a dual type inflator which uses two igniters activated separately.

By fitting the opening portion of the cup member into the annular groove formed in the closure surface, the cup member can be positioned, and the cup member can be supported and fixed more securely. The volume of the interior space formed by the cup member is substantially equal to the internal volume of the cup member.

By fitting the opening portion of the cup member into the protruding portion provided on the closure surface, the cup member can be positioned easily, and the cup member can be supported and fixed securely.

By using a cup member provided with a flange portion on its opening portion, the cup member can be positioned easily, and the cup member can be supported and fixed securely.

A predetermined amount of a solid gas generating agent is preferably charged into the space surrounded by the cup member, and pressurized gas is preferably charged into the remaining space. However, the pressurized gas may be charged into the space inside the cup together with the gas generating agent.

At this time, the igniter is accommodated in the interior of the cup member. Further, between the pressurized gas charging space and the gas discharge port closes a rupturable plate formed from stainless steel, iron, or the like, which ruptures with an increase in pressure.

The following methods may be applied to the assembly method of the present invention.

(I) A method of forming the convex portion by pressing the cylindrical housing in a predetermined position from the outside, and then press-inserting the cup member through the opening portion on one end of the cylindrical housing up to the formation position of the convex portion such that the cup member is supported and fixed.

(II) A method of inserting the cup member through the opening portion on one end of the cylindrical housing, and then forming the convex portion by pressing the cylindrical housing in a predetermined position from the outside such that the cup member is supported and fixed.

(III) A two-stage fixing method of first forming the convex portion with a low height by pressing the cylindrical housing lightly, and then, once the cup member has been inserted, forming the high convex portion by pressing the cylindrical housing deeply such that the cup member is fixed.

The invention claimed is:

1. An air bag inflator, comprising:
   a cylindrical housing defining an internal space therein and having a circumferential wall provided with a plurality of convex portions that protrude towards the internal space, the cylindrical housing including a first open end;
   a first closure member attached to and closing the first open end;
   an igniter provided in the first closure member; and
   a cup member including an open end, an end surface, and a peripheral surface having a constant outer diameter and extending between the open end and the end surface, and being fixed in the cylindrical housing by being pressed by the plurality of convex portions at one of an outer periphery of the end surface and the peripheral surface and by abutting the open end to the first closure member, the cup member being provided with holes communicating an inside of the cup member and the internal space.

2. An air bag inflator according to claim 1, wherein the plurality of convex portions are provided so as to be independently aligned along a circumferential direction of the cylindrical housing.

3. An air bag inflator according to claim 2, further comprising:
   a gas generating agent provided in the cup member and wherein the holes in the cup member are closed by a closing member.

4. An air bag inflator according to claim 3, wherein
   the cup member defines a first combustion chamber and a second combustion chamber in an outside and an inside thereof, respectively, and wherein
   the gas generating agent is provided in the second combustion chamber and another gas generating agent is provided in the first combustion chamber.

5. An air bag inflator according to claim 2, further comprising:
   a second closure member attached to and closing a second open end of the cylindrical housing opposite to the first open end, and including a gas discharge ports and a rupturable member isolating the internal space from an outside of the cylindrical housing.

6. An air bag inflator according to claim 2, further comprising:
   a filter disposed within the cylindrical housing such that a gap is provided between an outer circumferential surface of the filter and an inner circumferential surface of the cylindrical housing.

7. An air bag inflator according to claim 2, further comprising:
   a second closure member attached to and closing a second open end of the cylindrical housing opposite to the first open end; and
   a filter disposed within the cylindrical housing,
   wherein the cylindrical housing is provided with gas discharge ports formed in a circumferential surface thereof and the filter is disposed such that one end of the filter is in contact with the second closure member.

* * * * *